(12) United States Patent
Suzuki et al.

(10) Patent No.: US 6,191,184 B1
(45) Date of Patent: Feb. 20, 2001

(54) RADIATION-SETTING COMPOSITION CONTAINING (METH)ACRYLIC COPOLYMERS CONTAINING ACID GROUPS

(75) Inventors: Nobuo Suzuki; Tsutomu Okita; Yoshihisa Masaki, all of Shizuoka (JP)

(73) Assignees: Fuji Photo Film Co., Ltd., Kanagawa; Fujifilm Olin Co., Ltd. Co., Ltd., Tokyo, both of (JP)

( * ) Notice: Under 35 U.S.C. 154(b), the term of this patent shall be extended for 0 days.

(21) Appl. No.: 09/303,568

(22) Filed: May 3, 1999

(30) Foreign Application Priority Data

May 15, 1998 (JP) .................................................. 10-133794

(51) Int. Cl.$^7$ .............................. C08F 2/50; C08L 33/08; C08L 33/10; C08J 3/28
(52) U.S. Cl. .............................. 522/79; 522/80; 522/85; 522/110; 522/113; 522/114; 522/120; 522/121
(58) Field of Search .............................. 522/79, 80, 85, 522/110, 113, 114, 120, 121, 177, 182, 183

(56) References Cited

U.S. PATENT DOCUMENTS

| | | | |
|---|---|---|---|
| 4,427,760 | * | 1/1984 | Nagazawa et al. . |
| 4,521,494 | * | 6/1985 | Mani . |
| 4,876,313 | * | 10/1989 | Lorah . |
| 5,266,646 | * | 11/1993 | Eisenhart et al. . |
| 5,824,748 | * | 10/1998 | Kesti et al. . |
| 5,998,091 | * | 12/1999 | Suzuki . |

* cited by examiner

Primary Examiner—Susan Berman
(74) Attorney, Agent, or Firm—Sughrue, Mion, Zinn, Macpeak & Seas, PLLC

(57) ABSTRACT

Radiation-setting compositions suitable for the formation of LCD spacers or protective layers which are excellent in photosetting properties (requiring no heat-setting) and development properties, have high adhesiveness to substrates and excellent mechanical characteristics, remain stable over a long storage time and show excellent working condition-dependency.

Such a radiation-setting composition for the formation of LCD spacers or protective layers comprises a (meth)acrylic acid-based copolymer having an acid value of 30 to 200 and a glass transition temperature of −30 to 180° C., a (meth)acrylate-based compound obtained by copolymerizing a monomer having a specific structure with a monomer at least having an acidic group, a radiation-sensitive compound and a solvent.

5 Claims, No Drawings

RADIATION-SETTING COMPOSITION CONTAINING (METH)ACRYLIC COPOLYMERS CONTAINING ACID GROUPS

FIELD OF THE INVENTION

This invention relates to radiation-setting compositions which are suitable for constructing spacers or protective layers in liquid crystal display (LCD) elements and solid-camera elements.

BACKGROUND OF THE INVENTION

A liquid crystal display element is usually provided with a spacer between a color filter and an array substrate to give a uniform film thickness of a liquid crystal layer. It has been conventionally conducted to form such spacers by adding spherical particles such as polymethyl methacrylate or spherical silica to the liquid crystal layer to secure the formation of voids of 3 to 10 $\mu$m.

These spherical particles would migrate within the liquid crystal layer. When the liquid crystal is pushed with a finger, etc., the voids vary due to the migration of the particles, and thereby the liquid crystal thickness is changed. This phenomenon sometimes results in troubles such as color-bleeding in the liquid crystal display or image distortion.

Thus, it is proposed to form spacers by using photosensitive resin compositions as a substitute for the spherical particles. It is possible to use, as a substitute for a spacer, a partly thickened photosensitive, colored composition for forming a color filter. Although such a colored composition layer containing a pigment can be formed simultaneously with the formation of the color filter, there arise some problems, i.e., a need of a high exposure amount for setting and insufficient setting of the bottom of the colored composition layer. In this case, moreover, the production cost is elevated due to use of an expensive pigment and a need of an additional step for preparing a pigment dispersion. Therefore, it has been required to develop a transparent photosensitive composition for forming the above-mentioned spacer.

On the other hand, JP-A-7-248625 discloses a radiation-setting composition for forming permanent films, for example, interlayer insulation films and protective films for liquid crystal displays with the use of a copolymer of an unsaturated carboxylic acid with a polymerizable compound containing epoxy group. (The term "JP-A" as used herein means an "unexamined published Japanese patent application".) To achieve desired physical properties by this technique, however, heat setting should be performed after the formation of a photosensitive layer, which takes a long time usually. This technique suffers from another disadvantage that since it is necessary to use a carboxylic acid or an acidic component as a substitute therefor, the epoxy ring undergoes thickening or solidifying reactions during storage.

SUMMARY OF THE INVENTION

An object of the present invention, which has been completed to solve the problems encountering in the prior art as described above, is to provide radiation-setting compositions suitable for the formation of LCD spacers which are excellent in photosetting properties (requiring no heat-setting) and development properties, have high adhesiveness to substrates and excellent mechanical characteristics, remain stable over a long storage time and show excellent environmental condition-dependency.

Another object of the present invention is to provide radiation-setting compositions suitable for the formation of LCD protective layers which are excellent in photosetting properties (requiring no heat-setting) and development properties and have high adhesiveness to substrates and excellent mechanical characteristics.

The present inventors have effected intensive studies and consequently found out that the above objects can be achieved by using radiation-setting compositions of the constitution as specified below.

(1) A radiation-setting composition for LCD spacers which comprises:

(A) a (meth)acrylic acid-based copolymer having an acid value of 30 to 200 and a glass transition temperature of $-30$ to $180°$ C.;

(B) a (meth)acrylate-based compound obtained by copolymerizing a monomer represented by the following formula (I) with a monomer at least having an acidic group;

(C) a radiation-sensitive compound; and (D) a solvent:

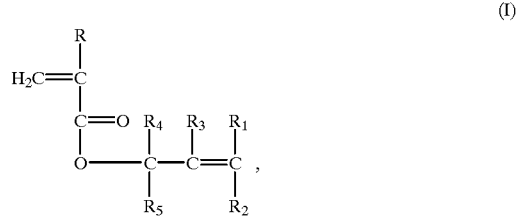

(I)

wherein R represents a hydrogen atom or a methyl group; and $R_1$ to $R_5$ each represents a hydrogen atom, a halogen atom, a cyano group, an alkyl group having 1 to 7 carbon atoms or an aryl group having 6 to 12 carbon atoms.

Preferred embodiments of the present invention are shown below.

(2) The radiation-setting composition for LCD spacers as described in the above (1), wherein said (meth)acrylic acid-based copolymer (A) is one represented by the following formula (2-1), (2-2) or (2-3) and having a weight-average molecular weight (Mw) of 3,000 to 300,000.

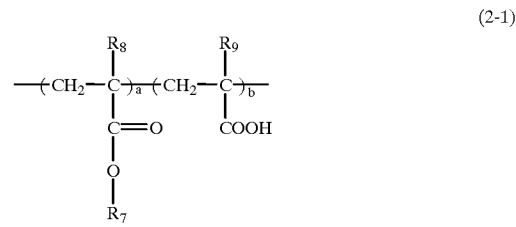

(2-1)

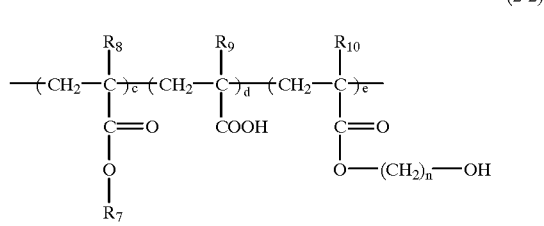

(2-2)

-continued

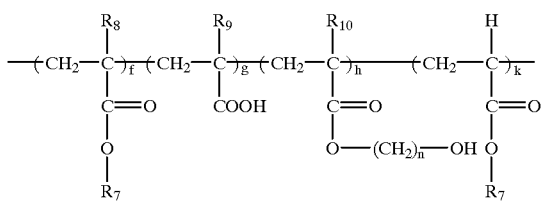

(2-3)

wherein $R_7$ represents an alkyl group with 1 to 18 carbon atoms, a phenyl group having an alkyl group with 1 to 4 carbon atoms, a phenyl group having an alkoxy group with 1 to 4 carbon atoms, an aryl group with 6 to 12 carbon atoms or an aralkyl group with 7 to 12 carbon atoms; $R_8$ to $R_{10}$ each represents a hydrogen atom or a methyl group; n is 2 or 3;

a, b: a/b=5/5 to 9/1;

c, d, e: c/(d+e)=5/5 to 9/1, d/e=9/1 to 2/8; and f, g, h, k: (f+k)/(g+h)=5/5 to 9/1, g/h=9/1 to 2/8, f/k=9/1 to 1/9.

(3) A radiation-setting composition for LCD protective layers which comprises:

(A) a (meth)acrylic acid-based copolymer represented by the formula (2-1), (2-2) or (2-3) as set forth in the above (2), having a weight-average molecular weight (Mw) of 3,000 to 300,000 and having an acid value of 30 to 200 and a glass transition temperature of −30 to 180° C.;

(B) a (meth)acrylate-based compound obtained by copolymerizing a monomer represented by the formula (I) as set forth in the above (1) with a monomer at least having an acidic group;

(C) a radiation-sensitive compound; and (D) a solvent.

According to the present invention, use of the radiation-setting compositions of the above constitutions makes it possible to control the film thickness and give a uniform film thickness. As a result, excellent LCD spacers having desired patterns can be obtained and color bleeding in the liquid crystal display or image distortion can be prevented. The radiation-setting compositions of the above constructions are also excellent in characteristics for LCD protective layers.

DETAILED DESCRIPTION OF THE INVENTION

Now, the present invention will be described in greater detail.

(A) (meth)acrylic acid-based copolymer having acid value of 30 to 200 and glass transition temperature of −30 to 180° C. (referred to also as copolymer (A)):

This copolymer (A) is a linear organic polymer which is soluble in organic solvents and aqueous solutions of weak alkalis and satisfies the above-mentioned requirements. The acid value of the copolymer (A) may be regulated to 30 to 200 by bonding an acidic group (for example, a carboxyl group or a sulfonic acid group) or a hydroxyl group into the side chain. A preferable example of the acidic group is the carboxylic group. The acid value of the copolymer (A) preferably ranges from 50 to 150, still preferably from 80 to 120. The glass transition temperature of the copolymer (A) preferably ranges from −10 to 150° C., still preferably from 0 to 130° C.

The glass transition temperature of this copolymer is expressed in the molar-weighted average of the glass transition temperatures of homopolymers, while the acid value thereof is a calculated value.

Examples of the copolymer (A) include 2-hydroxypropyl (meth)acrylate/polystyrene macromonomer/benzyl methacrylate/methacrylic acid copolymer, 2-hydroxy-3-phenoxypropyl acrylate/polymethyl methacrylate macromonomer/benzyl methacrylate/methacrylic acid copolymer, 2-hydroxyethyl (meth)acrylate/polystyrene macromonomer/methyl methacrylate/methacrylic acid copolymer and 2-hydroxyethyl (meth)acrylate/polystyrene macromonomer/benzyl methacrylate/methacrylic acid copolymer, which each satisfies the requirements of acid value and glass transition temperature as specified above as described in JP-A-7-140654.

It is preferable that the copolymer (A) is one represented by the formula (2-1), (2-2) or (2-3) as given above.

In the formulae (2-1), (2-2) and (2-3), the alkyl group having 1 to 18 carbon atoms represented by $R_7$ may be either linear, branched or cyclic one. Examples thereof include methyl, ethyl, propyl, butyl, heptyl, hexyl, octyl, decyl, dodecyl, hexadecyl, octadecyl, 2-chloroethyl, 2-bromoethyl, 2-cyanoethyl, 2-methoxycarbonylethyl, 2-methoxyethyl and 3-bromopropyl groups. Examples of the alkyl group with 1 to 4 carbon atoms included in the phenyl group include those having 1 to 4 carbon atoms among the alkyl groups with 1 to 18 carbon atoms as described above. Examples of the alkoxy group with 1 to 4 carbon atoms included in the phenyl group include methoxy, ethoxy, propoxy and butoxy groups.

Examples of the alkyl groups with 6 to 12 carbon atoms represented by $R_7$ include phenyl, tolyl and naphtyl groups. Examples of the aralkyl groups having 7 to 12 carbon atoms represented by $R_7$ include benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl and dimethoxybenzyl groups.

In the formula (2-1), a and b represent a molar ratio and a/b ranges from 5/5 to 9/1, preferably from 6/4 to 8/2. In the formula (2-2), c, d and e represent a molar ratio and c/(d+e) ranges from 5/5 to 9/1, preferably from 6/4 to 8/2 while d/e ranges from 9/1 to 2/8, preferably from 9/1 to 4/6 and still preferably from 8/2 to 5/5.

In the formula (2-3), f, g, h and k represent a molar ratio and (f+k)/(g+h) ranges from 5/5 to 9/1, preferably from 6/4 to 8/2, g/h ranges from 9/1 to 2/8, preferably from 9/1 to 4/6 and still preferably from 8/2 to 5/5, and f/k ranges from 9/1 to 1/9, preferably from 8/2 to 2/8.

In the above formulae (2-1), (2-2) and (2-3), it is preferable that $R_7$ represents an aralkyl group, still preferably a benzyl group.

Among these, preferable examples of the copolymer (A) are benzyl (meth)acrylate/(meth)acrylic acid copolymers and multicopolymers having additional monomer(s). The molar ratio of benzyl(methy)acrylate to the acid component (s) is from 5/5 to 9/1.

It is preferable that the copolymer (A) has a weight-average molecular weight (Mw) of 3,000 to 300,000, still preferably 5,000 to 200,000 and still preferably 8,000 to 100,000.

In the present invention, it is preferable that the copolymer (A) is used at a ratio of from 20 to 80% by weight, still preferably from 30 to 70% by weight, based on the total solid components of the composition.

(B) (Meth)acrylate-based compound obtained by copolymerizing monomer represented by the above formula (I) with monomer at least having acidic group (referred to also as compound (B)):

The compound (B) to be used in the present invention is a polymer obtained by copolymerizing a monomer represented by the above formula (I) with a monomer at least having an acidic group. Examples of the halogen atom, alkyl group and aryl group represented by $R_1$ to $R_5$ as described above are as follows.

Examples of the halogen atom include Cl, Br and I. The alkyl group may be either a linear, branched or cyclic one and examples thereof include methyl, n-propyl, isopropyl and tert-butyl groups. Those having 1 to 7 carbon atoms among these are preferable therefor. Examples of the aryl group include phenyl, tolyl and naphthyl groups.

The monomer represented by the formula (I) is synthesized by esterifying an alcohol having an unsaturated group represented by the following formula (I-a) with an acryl or methacryl group.

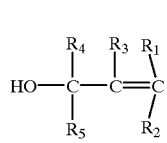

(I-a)

wherein $R_1$ to $R_5$ each has the same meaning as defined above with respect to the formula (I).

Typical examples of the compound represented by the formula (I-a) include allyl alcohol, methylallyl alcohol, crotyl alcohol, 3-chloro-2-propen-1-ol, 3-phenyl-2-propen-1-ol, 3,3-diphenyl-2-propen-1-ol, 3-bromo-3-phenyl-2-propen-1-ol, 2-methyl-3-phenyl-2-propen-1-ol, 2-methyl-3,3-diphenyl-2-propen-1-ol, 2-ethyl-1,3-diphenyl-2-propen-1-ol, 2,3-diphenyl-2-propen-1-ol, 1,2,3-triphenyl-2-propen-1-ol, 2,3,3-triphenyl-2-propen-1-ol, 1,3-diphenyl-2-propen-1-ol, 1,1,3-triphenyl-2-propen-1-ol, 1,1,3,3-tetraphenyl-2-propen-1-ol, 1-phenyl-2-propen-1-ol, 1,2-diphenhyl-2-propen-1-ol, 1-phenyl-2-methyl-2-propen-1-ol, 1-cyclohexyl-2-propen-1-ol, 2-benzyl-2-propen-1-ol, 1-carboxy-2-propen-1-ol, 1-cyano-2-propen-1-ol, 3-cyclopentyl-2-propen-1-ol, 3-bromo-2-propen-1-ol, 2-methyl-3-chloro-2-propen-1-ol, 2-methyl-3-bromo-2-propen-1-ol, 2-chloro-3-phenyl-2-propen-1-ol, (2-chorocinnamyl alcohol), 2-bromo-3-phenyl-2-propen-1-ol (2-bromocynnamyl alcohol), 2-fluro-3-phenyl-2-propen-1-ol (2-fluorocynnamyl alcohol), 2-cyano-3-phenyl-2-propen-1-ol (2-cyanocinnamyl alcohol), 2-chloro-2-propen-1-ol (2-chloroallyl alcohol), 2-bromo-2-propen-1-ol (2-bromoallyl alcohol), 2-bromo-3,3-difluoro-2-propen-1-ol, 2-chloro-3,3-difluoro-2-propen-1-ol, 2-fluoro-3-chloro-2-propen-1-ol, 2,3-dibromo-2-propen-1-ol and 2-chloro-3-methyl-2-propen-1-ol.

The compound (B) to be used in the present invention is obtained by copolymerizing at least a monomer having an unsaturated group represented by the formula (I) with a monomer at least having an acidic group to give a copolymer having the above-mentioned unsaturated group.

The monomer having an acidic group as described above may be a vinyl-based compound having an acidic group which is copolymerizable with the monomer having an unsaturated group of the formula (I). These monomers are described in, for example, "Kobunshi Deta Handobukku, Kisohen (Polymer Data Handbook: Basic)", ed. by Soc. of Polymer Science, Baifu-kan (1986). Particular examples thereof include acrylic acid, α- and/or β-substituted acrylic acids (for example, α-acetoxy, α-acetoxymethyl, α-(2-aminomethyl), α-chloro, α-bromo, α-fluoro, α-tributylsily, α-cyano, β-chloro, β-bromo, α-chloro-β-methoxy, and α,β-dichloro derivatives), methacrylic acid, itaconic acid, itaconic acid semiesters, itaconic acid semiamides, crotonic acid, 2-alkenylcarboxylic acids (for example, 2-pentenoic acid, 2-methyl-2-hexenoic acid, 2-octenoic acid, 4-methyl-2-hexenoic acid, 4-ethyl-2-octenoic acid), maleic acid, maleic acid semiesters, maleic acid semiamides, vinylbenzenecarboxylic acids, vinylbenzenesulfonic acids, vinylsulfonic acid, vinylphosphonic acid, vinyl or allyl semiester derivatives of dicarboxylic acids, ester derivatives of these carboxylic acids or sulfonic acids, and compounds having these acidic groups in substituents of amide derivatives. In the present invention, it is preferable to use acrylic acid, methacrylic acid, itaconic acid, crotonic acid or maleic acid therefor.

In addition to the monomer represented by the formula (I) and the acid group-containing monomer, use may be made of other monomer(s), for example, those corresponding to repeating units represented by the following formula:

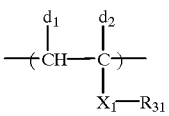

wherein $d_1$ and $d_2$ represent each a hydrogen atom, a halogen atom, a cyano group, a hydrocarbon group, or —COO—$R_{34}$ or —COO—$R_{34}$ mediated by a hydrocarbon group (wherein $R_{34}$ represents a hydrogen atom, an alkyl group, an alkenyl group, an aralkyl group, an alicyclic group or an aryl group); $X_1$ represents —COO—, —OCO—, —(CH$_2$)$_{m1}$—OCO—, —(CH$_2$)$_{m2}$—OCO— (wherein m1 and m2 are each an integer of 1 to 3), —O—, —SO$_2$—, —CO—, —CON($R_{33}$)—, —SO$_2$N($R_{33}$)—, —CONHCOO—, —CONHCONH— or —C$_6$H$_4$— (wherein $R_{33}$ represents a hydrogen atom or a hydrocarbon group); and $R_{31}$ represents a hydrocarbon group, provided that $R_{31}$ represents a hydrogen atom or a hydrocarbon group when $X_1$ is —C$_6$H$_4$—.

Preferable examples of the hydrocarbon group, in addition to a hydrogen atom, represented by $R_{33}$ include unsubstituted or substituted alkyl groups having 1 to 18 carbon atoms (for example, methyl, ethyl, propyl, butyl, heptyl, hexyl, octyl, decyl, dodecyl, hexadecyl, octadecyl, 2-chloroethyl, 2-bromoethyl, 2-cyanoethyl, 2-methoxycarbonylethyl, 2-methoxyethyl, 3-bromopropyl), unsubstituted or substituted alkenyl groups having 4 to 18 carbon atoms (for example, 2-methyl-1-propenyl, 2-butenyl, 2-pentenyl, 3-methyl-2-pentenyl, 1-pentenyl, 1-hexenyl, 2-hexenyl, 4-methyl-2-hexenyl), unsubstituted or substituted aralkyl groups having 7 to 12 carbon atoms (for example, benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, dimethoxybenzyl), unsubstituted or substituted alicyclic groups having 5 to 8 carbon atoms (for example, cyclohexyl, 2-cyclohexylethyl, 2-cyclopentylethyl), and unsubstituted or substituted aromatic groups having 6 to 12 carbon atoms (for example, phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, dodecyloylamidophenyl).

$R_{31}$ represents a hydrocarbon group. Preferable examples are the same as those described above with respect to $R_{33}$, provided that when $X_1$ in the formula is —$C_6H_4$—, then $R_{31}$ represents a hydrogen atom or a hydrocarbon group. When $X_1$ is —$C_6H_4$—, the benzene ring may be substituted. Examples of the substituent(s) thereof include halogen atoms (for example, chlorine, bromine), alkyl groups (for example, methyl, ethyl, propyl, butyl, chloromethyl, methoxymethyl) and alkoxy groups (for example, methoxy, ethoxy, propioxy, butoxy).

$d_1$ and $d_2$ may be the same or different from each other. Preferable examples thereof include a hydrogen atom, halogen atoms (for example, chlorine, bromine), a cyano group, alkyl groups having 1 to 4 carbon atoms (for example, methyl, ethyl, propyl, butyl), or —COO—$R_{34}$ or —COO—$R_{34}$ mediated by a hydrocarbon group (wherein $R_{34}$ represents a hydrogen atom or an unsubstituted or substituted alkyl, alkenyl, aralkyl, alicyclic or aryl group having 1 to 18 carbon atoms, and particular examples are the same as those described above with respect to $R_{33}$).

Examples of the hydrocarbon group in —COO—$R_{34}$ mediated by a hydrocarbon group include methylene, ethylene and propylene groups.

In the above formula, it is still preferable that $X_1$ represents —COO—, —OCO—, —$CH_2OCO$—, —$CH_2COO$—, —O—, —CONH—, $SO_2NH$— or —$C_6H_4$—; and $d_1$ and $d_2$ may be the same or different from each other and each represents a hydrogen atom, a methyl group, —COO—$R_{34}$ or —$CH_2COOR_{34}$ (wherein $R_{34}$ represents a hydrogen atom or an alkyl group having 1 to 6 carbon atoms such as methyl, ethyl, propyl, butyl or hexyl group. It is still preferable that at least one of $d_1$ and $d_2$ is a hydrogen atom.

In the compound (B), the molar ratio of the unsaturated group to the acidic group ranges preferably from 5/5 to 9/1, still preferably from 6/4 to 8/2.

In the compound (B), it is preferable that the content of the monomer(s) other than the monomer represented by the above formula (I) and the acid group-containing monomer is 50% by mol or less, still preferably 30% by mol or less, based on the total repeating units.

The weight-average molecular weight of the compound (B) ranges appropriately from 5,000 to 500,000, preferably from 10,000 to 200,000.

Now, examples of the compound (B) and the synthesis method thereof are illustrated. U.S. Pat. No. 2,047,398 discloses synthesis methods similar thereto.

Synthesis Example 1

1.68 1 of 1,2-dichloroethane was placed as a reaction solvent into a 4-necked flask provided with a stirring bar, stirring blades, a reflux condenser, a dropping funnel and a thermometer and stirred to 70° C. under nitrogen-replacement. 100.8 g of allyl methacrylate, 7.6 g of methacrylic acid and 1.68 g of 2,2'-azobis(2,4-dimethylvaleronitrile) employed as a polymerization initiator were dissolved in 0.44 l of 1,2-dichloroethane in the dropping funnel. The resulting solution was dropped into the flask over 2 hours under stirring.

After the completion of the addition, the mixture was stirred at 70° C. for additional 5 hours to thereby complete the reaction. After the completion of the heating, 0.04 g of p-methoxyphenol was added as a polymerization inhibitor and the liquid reaction mixture was concentrated to 500 ml. The obtained concentrate was added to 4 l of hexane. Then the precipitate thus formed was subjected to vacuum drying to give 61 g (yield 56%) of a copolymer A which showed a viscosity (η) of 0.068 in a methyl ethyl ketone solution at 30° C.

Polymers B, C and D were synthesized in the same manner as in SYNTHESIS EXAMPLE 1 except for using the following materials as poly(allylmethacrylate/methacrylic acid).

Polymer B:
poly(cinnamyl methacrylate/methacrylic acid) [copolymerization molar ratio: 70/30].

Polymer C:
poly(crotyl methacrylate/methacrylic acid) [copolymerization molar ratio: 75/25].

Polymer D:
poly(methacrylmethacrylate/methacrylic acid) [copolymerization molar ratio: 75/25].

Next, polymers E to F synthesized in the same manner will be illustrated. However, it is to be understood that the present invention is not restricted thereto.

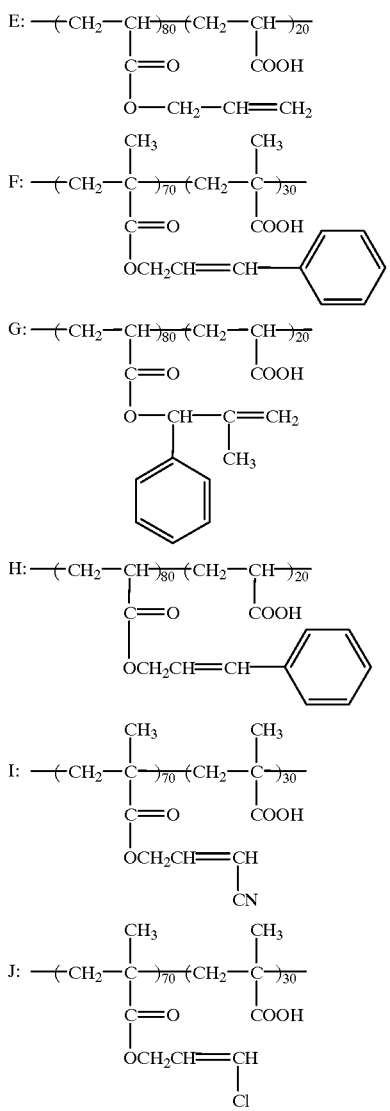

The compound (B) is used in the present invention at a ratio of 5 to 9% by weight, preferably 10 to 60% by weight, based on the total solid components of the composition.

In the composition, the above-mentioned copolymer (A) and the compound (B) are used preferably at a weight ratio of from 5/5 to 1/9, still preferably from 4/6 to 2/8.

In the present invention, the composition may further contain, in addition to the copolymer (A) and the compound (B) as described above, other resins for improving the development properties, physical properties (for example, mechanical characteristics, adhesiveness), etc.

Next, the radiation-sensitive compound of the component (C) will be illustrated.

As the radiation-sensitive compound, use may be made of a combination of various photopolymerizable monomers which have been conventionally well-known with polymerization initiators.

The ethylenically unsaturated compound having at least one addition-polymerizable ethylenic group and having a boiling point of 100° C. or more under normal pressure is exemplified as the photopolymerizable monomers.

Examples of the ethylenic unsaturated compound having at least one addition-polymerizable ethylenic group and having a boiling point of 100° C. or more under normal pressure include monofunctional acrylates and methacrylates such as polyethylene glycol mono(meth)acrylate, polypropylene glycol (meth)acrylate, phenoxyethyl (meth) acrylate; polyethylene glycolyl di(meth)acrylate, trimethylolethane tri(meth)acrylate, neopentyl glycol di(meth) acrylate, pentaerythritol tri(meth)acrylate, pentaerythritol tetra(meth)acrylate, dipentaerythritol hexa(meth)acrylate, dipentaerythritol penta(meth)acrylate, hexanediol (meth) acrylate, trimethylolpropane triacrylate, trimethylolpropane tri(acryloyloxypropyl) ether, tri(acryloyloxyethyl) isocyanurate, ethylene glycol- and propylene glycol-adducts thereof, (meth)acrylates obtained after adding ethylene oxide or propylene oxide to polyfunctional alcohols such as glycerin or trimethylolethane; urethane acrylates disclosed in JP-B-48-41708, JP-B-50-6034 and JP-A-51-37193; polyester acrylates disclosed in JP-A-48-64183, JP-B-49-43191 and JP-B-52-30490; and polyfunctional acrylates and methacrylates formed by reacting epoxy resins with (meth)acrylic acid (The term "JP-B" as used herein means an "examined Japanese patent application".). Moreover, use can be also made therefor of photosetting monomers and oligomers stated in Nippon Secchaku Kyokaishi (Journal of Japanese Society of Adhesives), vol. 20, No. 7, pp. 300–308.

Among the compounds described above, it is preferable to use dipentaerythritol penta(meth)acrylate, dipentaerythritol hexa(meth)acrylate, pentaerythritol tetra(meth)acrylate, trimethylpropane triacrylate and ethylene glycol- and propylene glycol-adducts thereof.

Such a polymerizable monomer or oligomer can be used at an arbitrary ratio, so long as the composition of the present invention can form, after radiation, an adhesive film without impairing the objects and effects of the present invention. It is preferable that the photopolymerizable monomer or oligomer is used at a ratio of 5 to 90% by weight, still preferably 10 to 50% by weight, based on the total solid components of the radiation-setting composition.

As the photopolymerization initiator, at least one active halogen compound selected from halomethyl oxadiazole compounds and halomethyl-s-triazine compounds, 3-aryl-substituted coumarine compounds and at least one lophine dimer are exemplified.

Examples of the active halogen compound such as halomethyl oxadiazole and halomethyl-s-triazine include 2-halomethyl-5-vinyl-1,3,4-oxadiazole compounds represented by the following formula (IV) which is described in JP-B-57-6096.

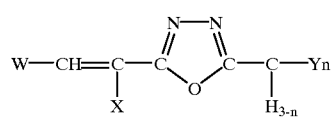

(IV)

In the formula (IV), W represents an unsubstituted or substituted aryl group; X represents a hydrogen atom, an alkyl group or an aryl group; Y represents a fluorine, chlorine or bromine atom; and n is an integer of 1 to 3.

Concrete examples of the compounds include 2-tirchloromethyl-5-styryl-1,3,4-oxadiazole, 2-trichloromethyl-5-(p-cyanostyryl)-1,3,4-oxadiazole and 2-trichloromethyl-5-(p-methoxystyryl)-1,3,4-oxadiazole. Examples of the halomethyl-s-triazine photopolymerization initiators include vinyl-halomethyl-s-triazine compounds represented by the following formula (V) which are disclosed in JP-B-59-1281, 2-(naphth-1-yl)-4,6-bis-halomethyl-s-triazine compounds represented by the following formula (VI) which are disclosed in JP-A-53-133428 and 4-(p-aminophenyl)-2,6-dihalomethyl-s-triazine compounds represented by the following formula (VII).

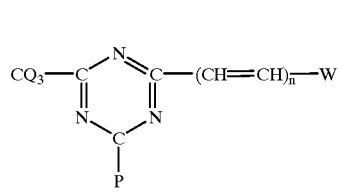

(V)

In the formula (V), $Q_3$ represents Br or Cl; P represents —$CQ_3$, —$NH_2$, —NHR, —$N(R)_2$ or —OR (wherein R represents phenyl or alkyl); and W represents an unsubstituted or substituted aromatic or heterocyclic nucleus or one represented by the formula (VA) (wherein Z represents —O— or —S—, and R has the same meaning as defined above).

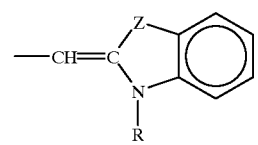

(VA)

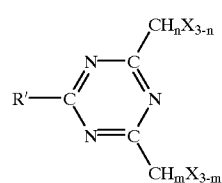

(VI)

In the formula (VI), X represents Br or Cl; m is an integer of from 0 to 3; and R' is represented by the formula (VIA) (wherein $R_1$ is H or $OR_c$ (wherein $R_c$ represents alkyl, cycloalkyl, alkenyl or aryl) and $R_2$ represents Cl, Br or an alkyl, alkenyl, aryl or alkoxy group).

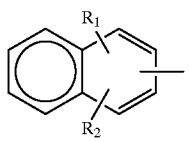

(VIA)

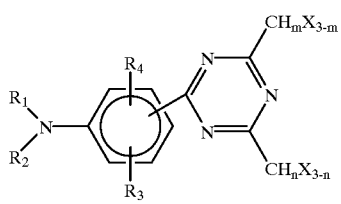

(VII)

In the formula (VII), $R_1$ and $R_2$ represent each H, an unsubstituted or substituted alkyl group or an unsubstituted or substituted aryl group or $R_1$ and $R_2$ are each represented by the formulae (VIIA) and (VIIB); $R_3$ and $R_4$ represent each H, a halogen atom or an alkyl or alkoxy group; X and Y represent each Cl or Br; and m and n are each 0, 1 or 2.

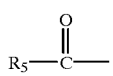

(VIIA)

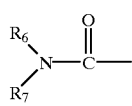

(VIIB)

In the above formulae (VIIA) and (VIIB), $R_5$, $R_6$ and $R_7$ represent each an unsubstituted or substituted alkyl or an unsubstituted or substituted aryl group. Examples of the substituents in the substituted alkyl and aryl groups include by aryl groups (for example, phenyl), halogen atoms, alkoxy, carboalkoxy, carboaryloxy, acyl, nitro and dialkylamino groups and sulfonyl derivatives.

In the formula (VII), $R_1$ and $R_2$ may form, together with the nitrogen atom to which they are bonded, a heterocycle composed of nitrogen atom(s) and non-metallic atom(s). In such a case, examples of the heterocycle include the following ones.

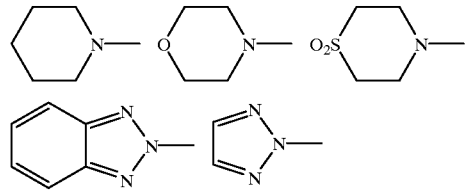

Concrete examples of the compounds of the formula (V) include 2,4-bis(trichloromethyl)-6-p-methoxystyryl-s-triazine, 2,4-bis(trichloromethyl)-6-(1-p-dimethylaminophenyl-1,3-butadienyl)-s-triazine and 2-trichloromethyl-4-amino-6-p-methoxystyryl-s-triazine.

Concrete examples of the compound of the formula (VI) include 2-(naphth-1-yl)-4,6-bis-trichloromethyl-s-triazine, 2-(4-mehtoxy-naphth-1-yl)-4,6-bis-trichloromethyl-s-triazine, 2-(4-ethoxy-naphth-1-yl)-4,6-bis-trichloromethyl-s-triazine, 2-(4-butoxy-naphth-1-yl)-4,6-bis-trichloromethyl-s-triazine, 2-[4-(2-methoxyethyl)-naphth-1-yl]-4,6-bis-trichloromethyl-s-triazine, 2-[4-(2-ethoxyethyl)-naphth-1-yl]-4,6-bis-trichloromethyl-s-triazine, 2-[4-(2-butoxyethyl)-naphth-1-yl]-4,6-bis-trichloromethyl-s-triazine, 2-(2-methoxy-naphth-1-yl)-4,6-bis-trichloromethyl-s-triazine, 2-(6-methoxy-5-methyl-naphth-2-yl)-4,6-bis-trichloromethyl-s-triazine, 2-(6-methoxy-naphth-2-yl)-4,6-bis-trichloromethyl-s-triazine, 2-(5-methoxy-naphth-1-yl)-4,6-bis-trichloromethyl-s-triazine, 2-(4,7-dimethoxy-naphth-1-yl)-4,6-bis-trichloromethyl-s-triazine, 2-(6-ethoxy-naphth-2-yl)-4,6-bis-trichloromethyl-s-triazine and 2-(4,5-dimethoxy-naphth-1-yl)-4,6-bis-trichloromethyl-s-triazine.

Concrete examples of the compounds represented by the formula (VII) include 4-[p-N,N-di(ethoxycarbonylmethyl) aminophenyl]-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloromethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)-carbonylaminophenyl]-2,6-di(trichloromethyl)-s-triazine, 4-[m-N,N-di(ethoxycarbonylmethyl)aminophenyl]-2,6-di(tri-chloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)-aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di-(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N- chloroethylaminophenyl)-2,6-di(trichloromethyl)-s-triazine, 4-(o-bromo-p-N-chloroethylaminophenyl)-2,6-di (trichloromethyl)-s-triazine, 4-(o-chloro-p-N-chloroethylaminophenyl)-2,6-di(trichloromethyl)-s-triazine and 4-(o-fluoro-p-N-chloroethylaminophenyl)-2,6-di (trichloromethyl)-s-triazine.

These initiators may be used together with the following initiators/sensitizers.

Namely, examples of the initiators/sensitizers include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-methoxyxanthone, thioxanthone, benzyl, dibenzalacetone, p-(dimethylamino)phenyl styryl ketone, p-(dimethylamino)phenyl-p-methyl styryl ketone, benzophenone, p-(dimethylamino)benzophenone (or Michler's ketone), p-(diethylamino)benzophenone, benzoanthrone and benzothiazole-based compounds disclosed in JP-B-51-48516.

The 3-aryl-substituted coumarine compounds as the photopolymerization initiator include those represented by the following formula (VIII). In this formula, $R_8$ represents a hydrogen atom, an alkyl group having 1 to 8 carbon atoms or an aryl group having 6 to 10 carbon atoms [preferably a hydrogen atom or a methyl, ethyl, propyl or butyl group]. $R_9$ represents a hydrogen atom, an alkyl group having 1 to 8 carbon atoms, an aryl group having 6 to 10 carbon atoms or a group represented by the following formula (VIIIA) [preferably a methyl, ethyl, propyl or butyl group or a group represented by the following formula (VIIIA), and still preferably a group of the formula (VIIIA)]. $R_{10}$ and $R_{11}$ represent each a hydrogen atom, an alkyl group having 1 to 8 carbon atoms (for example, methyl, ethyl, propyl, butyl, octyl), a haloalkyl group having 1 to 8 carbon atoms (for example, chloromethyl, fluoromethyl, trifluoromethyl), an alkoxy group having 1 to 8 carbon atoms (for example, methoxy, ethoxy, butoxy), an unsubstituted or substituted aryl group having 6 to 10 carbon atoms (for example, phenyl), an amino group, $—N(R_{16})(R_{17})$ or a halogen atom (for example, —Cl, —Br, —F), preferably a hydrogen atom, a methyl, ethyl, methoxy or phenyl group, $—N(R_{16})(R_{17})$ or —Cl. $R_{12}$ represents an unsubstituted or substituted aryl group having 6 to 16 carbon atoms (for example, phenyl, naphthyl, tolyl, cumyl). Examples of the substituent include an amino group, $—N(R_{16})(R_{17})$, an alkyl group having 1 to 8 carbon atoms (for example, methyl, ethyl, propyl, butyl, octyl), a haloalkyl group having 1 to 8 carbon atoms (for example, chloromethyl, fluoromethyl, trifluoromethyl), an alkoxy group having 1 to 8 carbon atoms (for example, methoxy, ethoxy, butoxy), a hydroxyl group, a cyano group and a halogen atom (for example, —Cl, —Br, —F). $R_{13}$, $R_{14}$, $R_{16}$ and $R_{17}$ represent each a hydrogen atom or an alkyl group having 1 to 8 carbon atoms (for example, methyl, ethyl, propyl, butyl, octyl). Alternatively, $R_{13}$ and $R_{14}$, and $R_{16}$ and $R_{17}$ may be bonded to each other to form, together with a nitrogen atom, each a heterocycle (for example, piperidine, piperazine, morpholine, pyrazole, diazole, triazole, benzotriazole). $R_{15}$ represents a hydrogen atom, an alkyl group having 1 to 8 carbon atoms (for example, methyl, ethyl, propyl, butyl, octyl), an alkoxy group having 1 to 8 carbon atoms (for example, methoxy, ethoxy, butoxy), an unsubstituted or substituted aryl group having 6 to 10 carbon atoms (for example, phenyl), an amino group, $—N(R_{16})(R_{17})$ or a halogen atom (for example, —Cl, —Br, —F). Zb represents =O, =S or =C($R_{18}$)($R_{19}$), preferably =O, =S or =C(CN$_2$) and still preferably =O. $R_{18}$ and $R_{19}$ represent each a cyano group, —COOR$_{20}$ or —COR$_{21}$. $R_{20}$ and $R_{21}$ represent each an alkyl group having 1 to 8 carbon atoms (for example, methyl, ethyl, propyl, butyl, octyl), a haloalkyl group having 1 to 8 carbon atoms (for example, chloromethyl, fluoromethyl, trifluoromethyl), or an unsubstituted or substituted aryl group having 6 to 10 carbon atoms (for example, phenyl).

Among these, particularly preferable 3-aryl-subsituted coumarine compounds are {(s-triazin-2-yl)amino}-3-arylcoumarine compounds represented by the formula (IX).

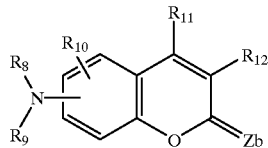

(VIII)

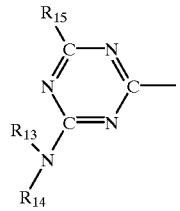

(VIIA)

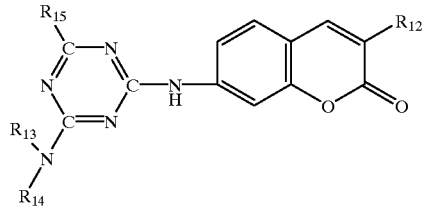

(IX)

The term "lophine dimer" means a 2,4,5-triphenylimidazolyl dimer consisting of two lophine residues. The fundamental structure is illustrated below.

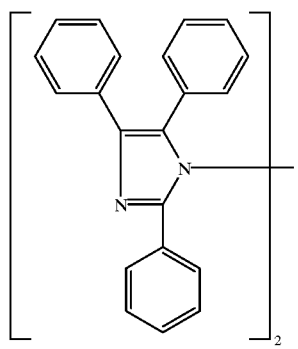

Concrete examples thereof include 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer and 2-(p-methylmercaptophenyl)-4,5-diphenylimidazolyl dimer.

It is also possible to use, as photopolymerization initiators, compounds represented by the following formula (I) which are disclosed in JP-A-10-62988.

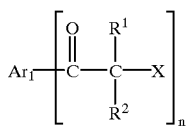

wherein n is 1 or 2;

when n is 1, $Ar_1$ represents a phenyl group, a chlorine atom, a bromine atom, a hydroxyl group, $—SR^9$, $—R^{10}$, $—OR^{10}$, $—SR^{10}$, $—SO_2R^{10}$, —S-phenyl or —O-phenyl group or a morpholino-substituted phenyl group (wherein $R^{10}$ represents an alkyl group having 1 to 9 carbon atoms); when n is 2, $Ar_1$ represents a phenylene-T-phenylene group (wherein T represents —O—, —S— or —CH$_2$—), (wherein $R^9$ represents a hydrogen atom, an unsubstituted or substituted alkyl group having 1 to 12 carbon atoms, an alkenyl group having 3 to 6 carbon atoms, a cyclohexyl group, a phenylalkyl group, a phenylhydroxyalkyl group, an unsubstituted or substituted phenyl group, a tolyl group, —CH$_2$—CH$_2$OH, —CH$_2$CH$_2$—OOC—CH=CH$_2$, —CH$_2$— COOR$^{11}$ (wherein $R^{11}$ represents an alkyl group having 1 to 9 carbon atoms), —CH$_2$CH$_2$—COOR$^{12}$ (wherein $R^{12}$ represents an alkyl group having 1 to 4 carbon atoms) or

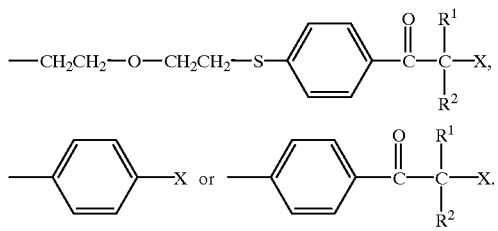

wherein $R^1$ and $R^2$ may be the same or different and each represents an alkyl group which may be substituted by —COOR$^{12}$ (wherein $R^{12}$ has the same meaning as defined above), or a phenylalkyl group having 7 to 9 carbon atoms, or $R^1$ and $R^2$ may form together an alkylene group having 4 to 6 carbon atoms;

X represents a morpholino group, —N(R$^4$)(R$^5$), —OR$^6$ or —O—Si(R$^7$)(R$^8$)$_2$;

$R^4$ and $R^5$ may be the same or different and each represents an alkyl group having 1 to 12 carbon atoms, an —OR$^{10}$-substituted alkyl group having 2 to 4 carbon atoms or an allyl group, or $R^4$ and $R^5$ may form together an alkylene group having 4 to 5 carbon atoms which may be mediated by —O—, —NH— or —N(R$^{10}$)—;

$R^6$ represents a hydrogen atom, an alkyl group having 1 to 12 carbon atoms, an allyl group or a phenylalkyl group having 7 to 9 carbon atoms; and $R^7$ and $R^8$ may be the same or different and each represents an alkyl group having 1 to 4 carbon atoms or a phenyl group.

In the present invention, it is also possible to use other well-known initiators in addition to those described above. Examples thereof include vicinal polyketolaldonyl compounds disclosed in U.S. Pat. No. 2,367,660; α-carbonyl compounds disclosed in U.S. Pat. Nos. 2,367,661 and 2,367,670; acyloin ether disclosed in U.S. Pat. No. 2,448,828; α-hydrocarbon-substituted aromatic acyloin compounds disclosed in U.S. Pat. No. 2,722,512; polynuclear quinone compounds disclosed in U.S. Pat. Nos. 3,046,127 and 2,951,758; a combination of triallylimidazole dimer/p-aminophenyl ketone disclosed in U.S. Pat. No. 3,549,367; and benzothiazole compounds/trihalomethyl-s-triazine compounds disclosed in JP-B-51-48516.

As initiators, it is also possible to use Adecaoptomer SP-150, SP-151, SP-170, SP-171, N-1717 and N-1414 which are manufactured by Asahi Denka Kogyo K.K.

It is preferable in the present invention to use, as a photopolymerization initiator, s-triazines having a trichloromethyl group (IR-369, IR-907, etc.) having the following structure.

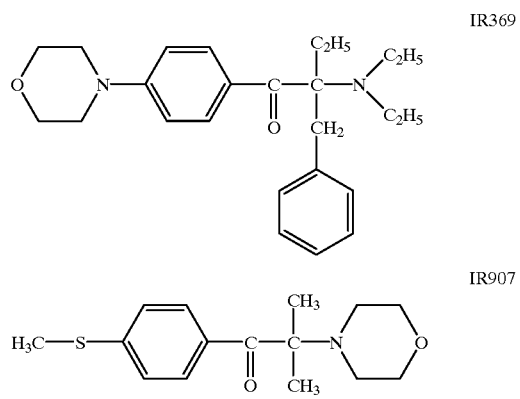

In the composition according to the present invention, the above-mentioned photopolymerization initiator is used preferably at a ratio of from 0.1 to 10% by weight, still preferably form 0.3 to 3% by weight, based on the total amount of the composition.

The composition of the present invention may contain, if needed, various additives, for example, fillers, polymers other than those described above, surfactants, adhesion accelerators, antioxidants, UV absorbers and cohesion inhibitors. The composition of the present invention may further contain pigment(s).

Concrete examples of these additives include fillers such as glass and alumina; polymer compounds other than those described above such as polyvinyl alcohol, polyacrylic acid, polyethylene glycol monoalkyl ether and polyfluoroalkyl acrylate; surfactants including nonionic, cationic and anionic ones such as polyoxyethylene alkyl ether, polyoxyethylene glycol dialkylate, sorbitol fatty acid esters (for example, Pluronic L10, L31, L61, L62, 10R5, 17R2 and 25R2 and Tetronic 304, 701, 704, 901, 904 and 150RI each manufactured by BASF Corp., Pluronic and Pluronic TR manufactured by Asahi Denka Corp.); fluorine-containing surfactants (for example, Megafac F171, F172, F173, F177 and R08 manufactured by DIC Corp.) and Asahi Guard AG710 and Serflon SC-101, SC-102, SC-103, SC-104 and SC-105 manufactured by Asahi Glass Co., Ltd.); adhesion accelerators such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane and 3-mercaptopropyltirmethoxysilane; antioxidants such as 2,2-thiobis(4-methyl-6-t-butylphenol) and 2,6-di-t-butylphenol; UV absorbers such as 2-(3-t-butyl-5-methyl-2-hydroxyphenyl)-5-chlorobenzotriazole and alkoxybenzophenone; and cohesion inhibitors such as sodium polyacrylate.

To elevate the alkali-solubility of unirradiated parts so as to further improve the development properties, the composition of the present invention may further contain organic carboxylic acids, more preferably, organic carboxylic acids with low molecular weight (i.e., 1,000 or less). Specific examples thereof include aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassilic acid, methylmalonic acid, ethylmalonic acid, dimethylmalonic acid, methylsuccinic acid, tetramethylsuccinic acid and citraconic acid; aliphatic tricarboxylic acids such as tricarballylic acid, aconitic acid and camphoronic acid; aromatic monocarboxlic acids such as benzoic acid, toluic acid, cumic acid, hemellitic acid and mesitylenic acid; aromatic polycarboxylic acids such as phthalic acid, isophthalic acid, terephthalic acid, trimellitic acid, trimesic acid, mellophanic acid and pyromellitic acid; and other carboxylic acids such as phenylacetic acid, hydroatropic acid, hydrocinnamic acid, mandelic acid, phenylsuccinic acid, atropic acid, cinnamic acid, methyl cinnamate, benzyl cinnamate, cinnamylideneacetic acid, coumalic acid and umbellic acid.

In addition to these components, it is preferable that the radiation-setting composition of the present invention further contain heat-polymerization inhibitors [for example, hydroquinone, p-methoxyphenol, di-t-butyl-p-cresol, pyrogallol, t-butylcathecol, benzoquinone, 4,4'-thiobis(3-methyl-6-t-butylphenol), 2,2'-methylenebis(4-methyl-6-t-butylphenol) and 2-mercaptobenzoimidazole].

Preferable examples of the solvents to be used as the component (D) in the preparation of the radiation-setting composition of the present invention include esters [for example, ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyactate, ethyl methoxyacetate, butyl methoxyacetate, methyl ethoxyacetate, ethyl ethoxyacetate, alkyl 3-oxypropionates such as methyl 3-oxypropionate and ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate and ethyl 2-oxobutanoate; ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol methyl ether acetate, propylene glycol ethyl ether acetate and propylene glycol propyl ether acetate; ketones such as methyl ethyl ketone, cyclohexanone, 2-heptanone and 3-heptanone; and aromatic hydrocarbons such as toluene and xylene.

Among these solvents, it is preferable to use methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether acetate, etc.

Either one of these solvents or a combination of two or more thereof may be used.

The composition of the present invention may be prepared by mixing the main components as described above optionally together with other additives with the solvent and then dispersed by using various mixers and dispersing machines.

The composition of the present invention is suitable for forming LCD spacers or protective layer patterns.

When the composition according to the present invention is used in forming an LCD spacer, it can be inserted between an array substrate and a color filter substrate. More particularly speaking, it may be located: ① on an ITO electrode layer of an array substrate; ② on a coloring layer of a color filter substrate; or ③ on both of the array substrate side and the color filter side. It is also possible to provide the LCD spacer on an oriented film made of polyimide, etc. which is located on the coloring layer of the color filter.

When the composition of the present invention is used in forming an LCD protective layer for a color filter, it may be located on the coloring layer of the color filter. It is also possible to provide the protective layer on an oriented film.

The composition of the present invention is applied onto the location site as described above by spin coating, casting, roll coating, etc. to thereby form a radiation-setting composition layer. Next, it is exposed to light via a definite mask pattern and then developed with a developer, thus giving the desired pattern.

In the present invention, the dry film thickness of the radiation-setting composition layer, in the case of a spacer, preferably ranges from 1 to 50 $\mu$m, still preferably from 1.0 to 20 $\mu$m and still preferably from 1.5 to 10 $\mu$m. In the case of a protective layer, the dry film thickness preferably ranges from 0.1 to 3 $\mu$m, still preferably from 0.2 to 1.5 $\mu$m.

As the radiation ray to be used in the exposure, UV rays such as g-, h- and i-rays are particularly preferable.

The pattern of the spacer includes dot-, stripe- and grid-forms. It is reasonable to select a pitch appropriate for the color filter and integral multiples thereof are preferably employed. The pattern may be in the form of a quadratic column, a round column, an oval column, a square pyramid, a quadratic prism with a trapezoidal section, or polygonal variations thereof.

Examples of the substrates include color filter substrates, those employed in liquid display elements, etc. (for example, soda glass, alkali-free glass, pyrex glass quartz glass, and their glass adhered with transparent conductive film), and photoelectric converter substrates employed in solid-camera elements (for example, silicone substrates). In general, these substrates are provided with black stripes for isolating individual pixels.

As a developer, an arbitrary one may be used so long as it can solubilize not the irradiated part but exclusively the radiation-setting composition of the present invention. More particularly speaking, use may be made therefor of combinations of various organic solvents or alkaline aqueous solutions.

As examples of the organic solvents, description may be made of those described above with respect to the solvent to be used in preparing the composition of the present invention.

Examples of the alkaline aqueous solutions include those prepared by dissolving alkaline compounds (for example, sodium hydroxide, potassium hydroxide, sodium carbonate, sodium hydrogencarbonate, potassium hydrogencarbonate, sodium silicate, sodium metasilicate, aqueous ammonia, ethylamine, diethylamine, monoethanolamine, diethanolamine, triethanolamine, dimethylethanolamine, tetramethylammonium hydroxide, tetraethylammonium hydroxide, choline, pyrrole, piperidine, 1,8-diazacyclo-[5,4,0]-7-undecene). The concentration of the alkaline aqueous solution is preferably 0.001 to 10% by weight, more preferably 0.01 to 1% by weight. When a developer comprising such an alkaline aqueous solution is used, it is a practice to wash the substrate with water after the completion of the development.

EXAMPLE

To further illustrate the present invention in greater detail, the following examples will be given. However, it is to be understood that the present invention is not restricted thereto but can be modified and varied without departing from the spirit and scope thereof.

Example 1

1. A composition for forming protective layer 1 as specified below was spin-coated onto a color filter layer having red (R), green (G) and blue (B) pixels formed on a glass substrate (350 mm×400 mm) of 1 mm in thickness and then dried to give a layer of the composition for forming protective layer of 3 $\mu$m in film thickness.

| (Composition for forming protective layer 1) | wt. part |
|---|---|
| poly(benzyl methacrylate/acrylic acid) (molar ratio = 7/3, weight-average molecular weight: 85,000, Tg = 73° C., acid value = 110) | 10 |
| poly(allyl methacrylate/methacrylic acid) (molar ratio = 8/2, weight-average molecular weight: 52,000) | 7.5 |
| dipentaerythritol hexaacrylate | 15 |
| 2,4-trichloromethyl(piperonyl)-6-triazine | 0.5 |
| methoxypropyl acetate | 67 |

The above-described layer of the composition for forming protective layer was UV-irradiated via a protective layer baking mask with the use of an ultrahigh pressure mercury lamp aligner at 200 mj/cm². Next, it was developed by spraying a 1% aqueous solution of sodium carbonate employed as a developer followed by water-washing. Subsequently, it was subjected to a heat treatment by allowing to stand in a dryer at 200° C. for 20 minutes and then cooled to give a protective layer.

Example 2

The same procedure as in EXAMPLE 1 was carried out, except for using a composition for forming protective layer 2 as specified below to give a protective layer.

| (Composition for forming protective layer 2) | wt. part |
|---|---|
| poly(benzyl methacrylate/acrylic acid/hydroxyethyl methacrylate) (molar ratio = 7/2/1, weight-average molecular weight: 78,000, Tg = 84° C., acid value = 108) | 10 |
| poly(allyl methacrylate/methacrylic acid) (molar ratio = 8/2, weight-average molecular weight: 35,000) | 7.5 |
| dipentaerythritol hexaacrylate | 15 |
| 2-benzyl-2-dimethylamino-1-(morpholinophenyl)-butanone-1 | 1.0 |
| methoxypropyl acetate | 67 |

Comparative Example 1

The same procedure as in EXAMPLE 1 was carried out, except for substituting the poly(benzyl methacrylate/acrylic acid) in the composition for forming protective layer 1 by:

poly(benzyl methacrylate/acrylic acid)
(molar ratio=9.5/0.5, weight-average molecular weight: 68,000, Tg=70° C., acid value 20)
to give a protective layer.

Comparative Example 2

The same procedure as in EXAMPLE 1 was carried out, except for substituting the poly(benzyl methacrylate/acrylic acid) in the composition for forming protective layer 1 by 17.5 parts by weight of:

poly(benzyl methacrylate/acrylic acid)
(molar ratio=7/3, weight-average molecular weight: 55,000)
to give a protective layer.

These protective layers thus obtained were each evaluated for the development properties, adhesiveness to substrate, deformation and scratch resistance as follows. The results are shown in Table 1.

Evaluation Method

Development Properties

A layer of a composition for forming protective layer of 5 $\mu$m in dry film thickness was formed on a glass substrate. After exposing to a mercury lamp at 50 mj/cm², it was developed with a 1% aqueous solution of sodium carbonate at 30° C. for 60 seconds and then the surface of the protective layer was observed with the microscope. The unexposed part (i.e., masked part) was observed and thus the development properties were evaluated. The exposed part was also observed and thus the setting property was evaluated.

Adhesiveness to Substrate

A layer of a composition for forming protective layer of 3 $\mu$m in dry film thickness was formed on a glass substrate. After totally exposing at 200 mj/cm², it was developed, crosscut and peeled off by using a Mylar tape so that the adhesiveness was evaluated. A sample having no peeling-off in 100 crosscut sites was referred to as highly adhesive. The peeling-off sites, from among 100, were counted and samples showing peeling-off even in one site were referred to as being poor in adhesiveness.

Deformation

A steel ball of 0.5 mm in diameter was pushed against the surface of each of the above-described protective layers in such a manner as to apply a load of 50 g at the contact point for 1 minute. After eliminating the steel ball, the deformation and damage around the contact point were observed with the microscope.

Scratch Resistance

The surface of each of the above-described protective layers was scratched with a sapphire needle (0.1 mmR) under a load of 50 g. Then the scratches thus formed were observed with the microscope.

Development Properties

Each column-type spacer thus obtained was observed microscope. In EXAMPLES 3 to 5, tapered columns of 11 to 12 μm in the top face were obtained. In COMPARATIVE EXAMPLE 3, on the other hand, a large top face (15 μm) exceeding the mask size was observed. When the mask size

TABLE 1

|  | Development properties | Setting property | Adhesiveness | Deformation | Scratch resistance |
|---|---|---|---|---|---|
| Example 1 | good | good | good | none | good |
| Example 2 | good | good | good | none | good |
| Comparative Example 1 | good | poor in linearity(*1) | 5 among 100 showing peeling-off | cracks observed around contact point | scratches observed |
| Comparative Example 2 | good | poor in linearity(*1), poor in exposed surface | 10 among 100 showing peeling-off | many cracks observed around contact point | many scratches observed, some reached substrate |

(*1): Being poor in the linearity in the boundary between the masked and unmasked parts.

As is apparent from the results of Table 1, the protective layer samples of EXAMPLES 1 and 2 according to the present invention are excellent in all of the test items, i.e., development properties, setting property, adhesiveness, deformation and scratch resistance. In contrast, none of the comparative samples gives satisfactory results.

Example 3

The same composition as in EXAMPLE 1 was spin-coated onto an array substrate provided with an electrode pattern. After prebaking at 100° C. for 120 seconds, it was exposed to light by using a high pressure mercury lamp (20 mW/cm$^2$) at 200 mJ/cm$^2$ through a mask having a dot pattern (10 μm×10 μm dot/80 μm×200 μm). Then the thus exposed substrate was developed with the use of a developer prepared by 5-fold diluting CD-2000 (manufactured by Fujifilm Olin Co., Ltd.) at 26° C. for 30 seconds and then rinsed with water. Next, it was post-baked in a thermostat chamber at 230° C. for 30 minutes to thereby give a substrate having a desired column-type spacer of 5 μm in height.

Example 4

By using the same composition as in EXAMPLE 2, a spacer was formed in the same manner as in EXAMPLE 3.

Example 5

By using the same composition as in EXAMPLE 1 except for using, as a substitute for the poly(benzyl methacrylate/acrylic acid) (molar ratio=7/3, weight-average molecular weight: 85,000, Tg=73° C., acid value=110): poly(benzyl methacrylate/benzyl acrylate/acrylic acid/hydroxyethyl methacrylate) (molar ratio=4/3/2/1, weight-average molecular weight: 30,000, Tg=46° C., acid value=77); a spacer was formed in the same manner as in EXAMPLE 3.

Comparative Example 3

By using the same composition as in COMPARATIVE EXAMPLE 1, a spacer was formed in the same manner as in EXAMPLE 3.

The spacers obtained in the above EXAMPLES 3 to 5 and COMPARATIVE EXAMPLE 3 were evaluated for the development properties and mechanical properties as follows.

was reduced to 5 μm, no column was formed in COMPARATIVE EXAMPLE 3 due to the inappropriate development properties.

Mechanical Characteristics

Each of the composition layers obtained above was totally solid-exposed to light and then a load was applied onto the obtained substrate by using an ultrafine hardness meter DUH-200 (manufactured by Shimadzu Corporation). Then, the indentation displacement was measured at 20° C. and 80° C. at a pressure head angle of 115° and a test load of 0.5 g. A larger indentation displacement indicates that the spacer would easily follow the deformation of liquid crystals so as to cause little color-bleeding in the liquid crystal display or image distortion.

The results are shown in Table 2.

TABLE 2

|  |  | Indentation displacement (Mn) | |
|---|---|---|---|
| | Development properties | 20° C. | 80° |
| Example 3 | column with top face of 11.0 μm | 0.5 | 0.7 |
| Example 4 | column with top face of 11.5 μm | 0.4 | 0.6 |
| Example 5 | column with top face of 12.0 μm | 0.5 | 0.7 |
| Comparative Example 3 | column with top face of 15.0 μm | 0.1 | 0.3 |

As is apparent from the results of TABLE 2, the spacers with the use of the compositions of the present invention show large indentation displacements, as compared with the spacer of COMPARTIVE EXAMPLE 3, and thus cause little image distortion or color-bleeding when liquid crystals or color filters are pushed.

The radiation-setting compositions according to the present invention are suitable for forming LCD spacers and protective layers. More particularly speaking, these compositions are excellent in photosetting properties and development properties, have high adhesiveness to substrates and excellent mechanical characteristics, remain stable over a long storage time and show excellent environmental condition-dependency.

While the invention has been described in detail and with reference to specific embodiments thereof, it will be apparent to one skilled in the art that various changes and modifications can be made therein without departing from the spirit and scope thereof.

What is claimed is:

1. A radiation-setting composition for liquid crystal display (LCD) spacers which comprises:

(A) a (meth)acrylic copolymer comprising (meth)acrylic acid, said (meth)acrylic copolymer having an acid value of 30 to 200 and a glass transition temperature of −30 to 180° C.;

(B) a (meth)acrylic copolymer obtained by copolymerizing a monomer represented by the following formula (I) with a vinyl monomer at least having an acidic group;

(C) a radiation-sensitive compound; and (D) a solvent:

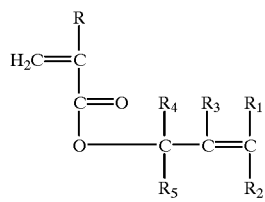
(I)

wherein R represents a hydrogen atom or a methyl group; and $R_1$ to $R_5$ each represents a hydrogen atom, a halogen atom, a cyano group, an alkyl group having 1 to 7 carbon atoms or an acryl group having 6 to 12 carbon atoms.

2. The radiation-setting composition for LCD spacers as claimed in claim 1, wherein said (meth)acrylic copolymer (A) is one represented by the following formula (2-1), (2-2) or (2-3) and having a weight-average molecular weight (Mw) of 3,000 to 300,000:

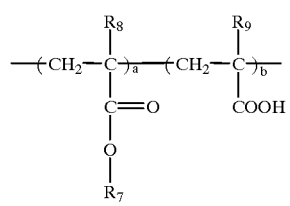
(2-1)

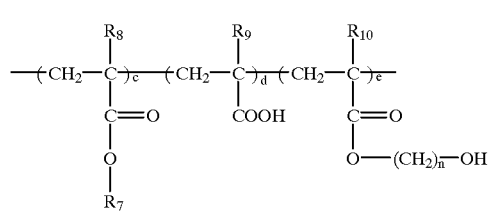
(2-2)

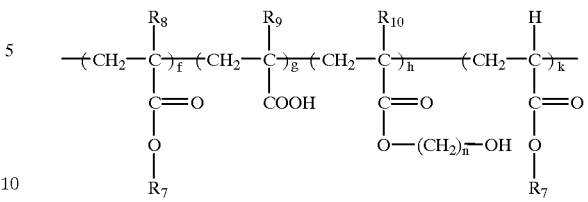
(2-3)

wherein $R_7$ represents an alkyl group with 1 to 18 carbon atoms, a phenyl group having an alkyl group with 1 to 4 carbon atoms, a phenyl group having an alkoxy group with 1 to 4 carbon atoms, an aryl group with 6 to 12 carbon atoms or an aralkyl group with 7 to 12 carbon atoms; $R_8$ to $R_{10}$ each represents a hydrogen atom or a methyl group; n is 2 or 3;

a, b: a/b=5/5 to 9/1;

c, d, e: c/(d+e)=5/5 to 9/1, d/e=9/1 to 2/8; and f, g, h, k: (f+k)/(g+h)=5/5 to 9/1, g/h=9/1 to 2/8, f/k=9/1 to 1/9.

3. The radiation-setting composition for LCD spacers as claimed in claim 1, wherein said (meth)acrylic copolymer (A) is contained at a ratio of from 20 to 80% by weight based on the total solid components of the composition.

4. The radiation-setting composition for LCD spacers as claimed in claim 1, wherein said (meth)acrylic copolymer (B) is contained at a ratio of from 5 to 9% based on the total solid components of the composition.

5. A radiation-setting composition for LCD protective layers which comprises:

(A) a (meth)acrylic copolymer comprising (meth)acrylic acid, said (meth)acrylic copolymer being represented by the following formula (2-1), (2-2) or (2-3), having a weight-average molecular weight (Mw) of 3,000 to 300,000 and having an acid value of 30 to 200 and a glass transition temperature of −30 to 180° C.;

(B) a (meth)acrylic copolymer obtained by copolymerizing a monomer represented by the following formula (I) with a vinyl monomer at least having an acidic group;

(C) a radiation-sensitive compound; and (D) a solvent:

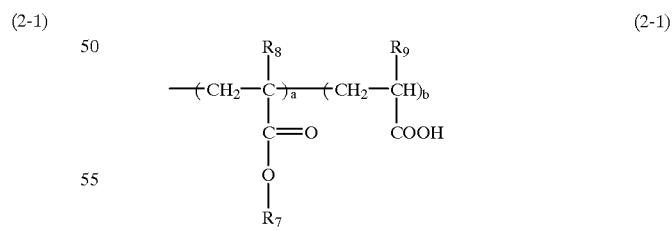
(2-1)

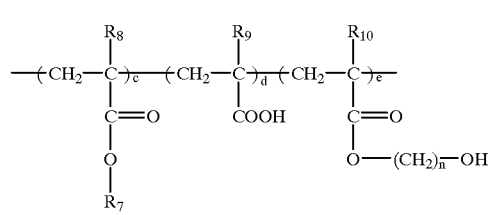
(2-2)

-continued

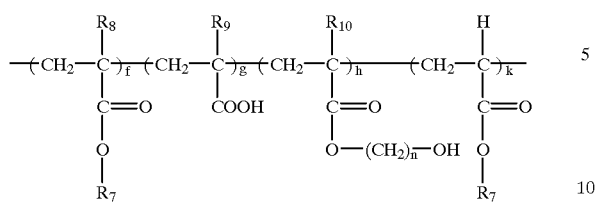
(2-3)

wherein $R_7$ represents an alkyl group having 1 to 18 carbon atoms, a phenyl group having an alkyl group with 1 to 4 carbon atoms, a phenyl group having an alkoxy group with 1 to 4 carbon atoms, an aryl group with 6 to 12 carbon atoms or an aralkyl group with 7 to 12 carbon atoms; $R_8$ to $R_{10}$ each represents a hydrogen atom or a methyl group; n is 2 or 3;

a, b: a/b=5/5 to 9/1;
c, d, e: c/(d+e)=5/5 to 9/1, d/e=9/1 to 2/8; and
f, g, h, k: (f+k)/(g+h)=5/5 to 9/1, g/h=9/1 to 2/8, f/k=9/1 to 1/9

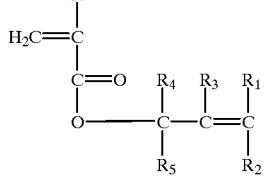
(I)

wherein R represents a hydrogen atom or a methyl group; and $R_1$ to $R_5$ each represents a hydrogen atom, a halogen atom, a cyano group, an alkyl group having 1 to 7 carbon atoms or an aryl group having 6 to 12 carbon atoms.

* * * * *